United States Patent Office 3,552,883
Patented Jan. 5, 1971

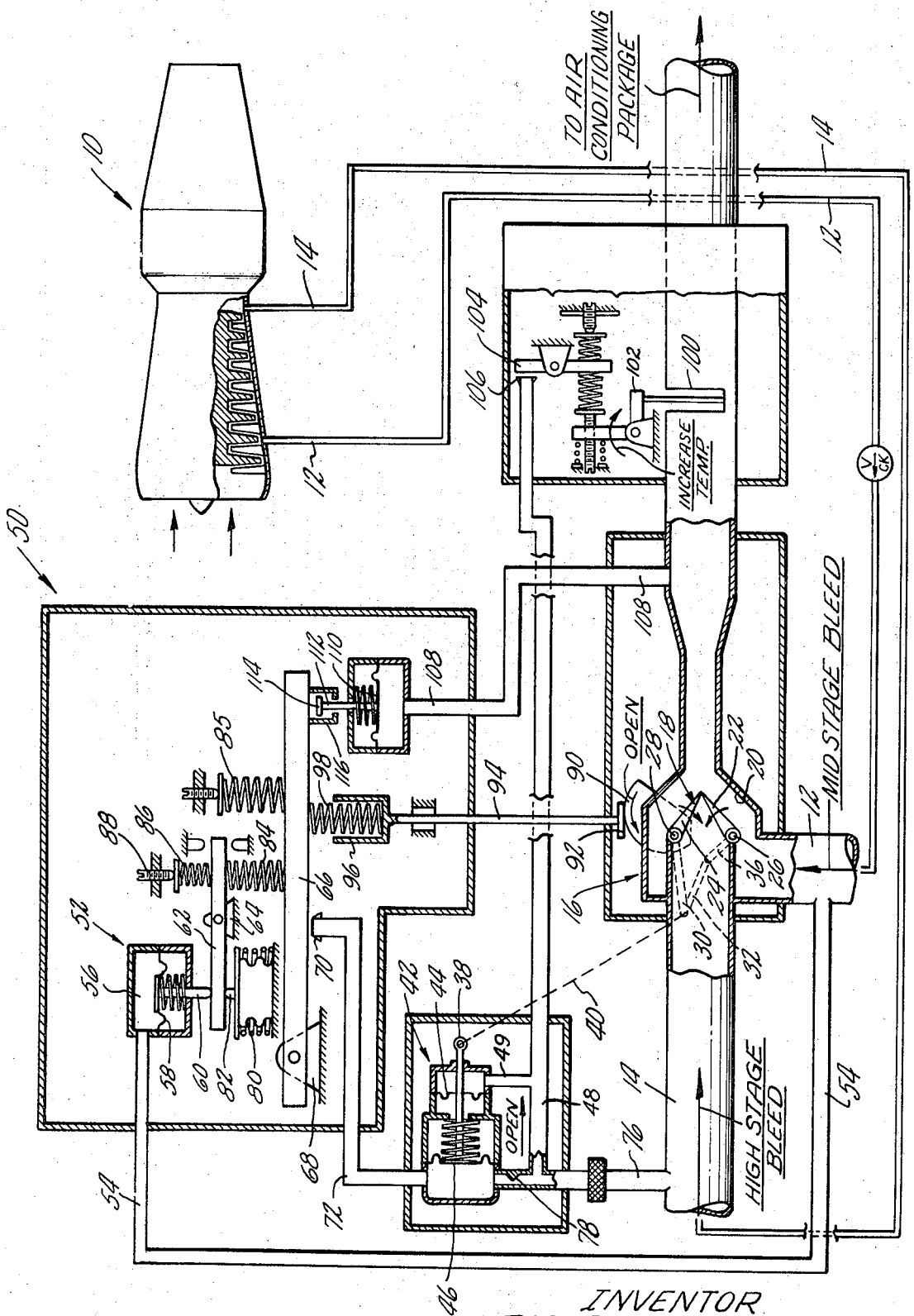

3,552,883
EJECTOR CONTROL SYSTEM
Roger D. Weatherbee, Windsor Locks, Conn., assignor to United Aircraft Corporation, East Hartford, Conn., a corporation of Delaware
Filed Feb. 24, 1969, Ser. No. 801,673
Int. Cl. F04b 23/04
U.S. Cl. 417—76                            8 Claims

ABSTRACT OF THE DISCLOSURE

An ejector for augmenting the flow from the midstage bleed of an aircraft compressor by driving the primary nozzle by high-stage bleed for supplying pressurized air to an aircraft air-conditioning system includes a control responding to midstage bleed pressure to control the areas of the primary and secondary nozzles of the ejector. Temperature and pressure override means further control the ejector in accordance with a predetermined flow-pressure schedule.

BACKGROUND OF THE INVENTION

This invention relates to an air-conditioning system utilizing high and midstage bleed of the compressor of a jet type engine wherein the high-stage bleed powers an ejector and particularly to control means therefor.

In a patent application Ser. No. 740,610 filed on June 27, 1968, by John L. Warner and entitled "Ejector," and assigned to the same assignee, the details of an ejector are claimed and disclosed wherein the ejector powered by the high-stage bleed has a variable area primary nozzle and a variable area secondary nozzle.

This invention relates to the above-mentioned patent application insofar as it employs an ejector of the type disclosed therein but is more concerned with the control therefor so as to assure that the area of the primary and secondary nozzles are so regulated to more effectively control the pressure and flow to the air-conditioning package for an aircraft air-conditioning system.

In addition, in aircraft installations that employ more than one ejector located in parallel relationship, the utilization of the midstage pressure as the primary control parameter for controlling the area of the nozzles of the ejectors tends to assist in flow and pressure sharing to prevent the primary nozzle of one ejector to being at a different load operation while the other one or ones are at a less load operation. This results from the tendency of ejectors over a range of their operating capability to produce higher mixed outlet pressure with increasing flow when the outlet mixed temperature is kept at some upper limiting value. This is the reverse of the characteristics of most kinds of pumps or compressors. The result is a destabilizing effect where one ejector tends to block the output of another in parallel with it so that the total flow is reduced below the capacity of the ejectors operating independently. The use of midstage pressure as a control parameter while it does not eliminate imbalance in sharing flow, it reduces the imbalance over controls which use other parameters as the basic control means. It also avoids the complexity of directly sensing the flow imbalance and using this as a control parameter.

SUMMARY OF INVENTION

The primary object of this invention is to provide an improved ejector control for synchronously regulating the areas of the primary and secondary nozzles.

A still further object of this invention is to provide in a high and midstage jet engine compressor bleed system means for controlling the area of the nozzles of the ejector driven by the high-stage bleed as a function of midstage bleed pressure.

A still further object of the present invention is to provide in a control as described means responsive to the pressure in the midstage bleed to vary the areas of the primary and secondary nozzles of an ejector driven by the high-stage bleed and including means for biasing the control as a function of altitude and additional means for limiting the temperature of the fluid discharging from the ejector.

BRIEF DESCRIPTION OF THE DRAWING

The sole figure is a schematic illustration showing the preferred embodiment of this invention.

DESCRIPTION OF THE PREFERRED EMBODIMENT

As can be seen from the sole figure, reference numeral 10 generally illustrates a typical jet engine having a plurality of axial stage compressors which are bled to provide the air for an air-conditioning package, not shown, through lines 12 and 14, noting that line 14 communicates with the higher stage compressor and line 12 communicates with the lower stage compressor, hereinafter referred to as the high-stage bleed and the midstage bleed, respectively. This invention has specific reference where an ejector of the type disclosed in patent application Ser. No. 740,610, filed on June 27, 1968, supra, is employed. As for illustration of the preferred embodiment, an ejector 16, although not necessarily limited to this type, includes primary nozzle 18 powered by the high-stage bleed evidenced in line 14 augments flow in the secondary nozzle 20 which is in communication with the midstage bleed. The nozzle areas of ejector 16 are synchronously varied by a pair of pivotally mounted flaps 22 and 24 supported to rotatably mounted shafts 26 and 28, respectively. Link 30 connected to shaft 28 and links 32 and 36 connected to shaft 26 serve to rotate flaps 22 and 24 to synchronously open primary nozzle 18 and close nozzle 20. Link 30 and links 32 and 36 are connected to the actuator connecting rod 38 by the connection 40 shown by dash lines and serve to convert the rectilinear motion produced by actuator 42 to rotate flaps 22 and 24. As noted, positioning rod 38 to the right moves the ends of links 30 and 32 downwardly which in turn rotates shaft 28 counterclockwise, and rotates link 36 and hence shaft 26 clockwise to move flaps 22 and 24 to the opened position.

Actuator 42 may be the half area type comprising diaphragms 44 and 46 wherein the area of diaphragm 44 is ½ the area of diaphragm 46. High-pressure servo fluid (high-pressure bleed air) admitted on the right-hand side of diaphragm 44 via lines 76, 48, and 49 continuously urges rod 38 to the left. This force (that created by the pressure acting on diaphragm 44) is counterbalanced during steady state by the force created by the metered pressure acting on the left-hand side of diaphragm 46.

Essentially, actuator 42 is generally controlled by the controller generally illustrated by numeral 50 which includes pressure sensor 52 sensing the pressure in the midstage line 12 admitted into chamber 56 via the conduit 54. This pressure acts upon diphragm 58 which serves to position the rod 60 against the lever 62. Lever 62 in turn is pivotable about pivot member 64 and serves to impose a load on the pivotable lever 66. Lever 66 which is pivotable about pivot 68 serves to move toward and away from the flapper nozzle 70 which is formed on the end of conduit 72 which is in communication with the left-hand side of diaphragm 46. High pressure air is admitted into actuator 42 via line 76 by first passing through fixed restriction 78. By varying curtain area of flapper nozzle 70, the pressure drop across 78 is made to vary which, in turn, varies the pressure acting against diaphragm 46. As a consequence, the position of actuator 42 corresponds to the signal sensed by the pressure sensor 52. As shown in the figure, the pressure sensor 52 is made to reference an absolute value by acting against evacuated bellows 80 which carries plunger 82 acting against the underside of fulcrum lever 62. The force created by sensor 52 is imparted to lever 66 by spring 84 which is connected to the underside of lever 62. A lightweight spring 86 may be included so as to set the position of lever 62 and the mechanical adjusting means 88 may be utilized to serve this purpose. Adjustable spring 85, likewise, may be used to set lever 66 so as to properly load it.

Feedback is effectuated by the utilization of cam 90 which is secured to shaft 28 and rotates therewith. Platen 92 formed on the end of plunger 94 serves to position the spring retainer 96 and obviously load and unload spring 98 in relation to the position of flaps 22 and 24. Thus opening and closing of flaps 22 and 24 moves spring retainer 96 up and down with respect to the drawing for compressing and unloading spring 98 which bears against lever 66. This in turn resets lever 66 relative to flapper nozzle 70 to return it to its nulled position.

As is obvious from the foregoing, an increase in the mid-stage bleed pressure, for example, would increase the pressure in chamber 56 positioning diaphragm 58 downwardly which in turn urges the plunger 60 against fulcrum lever 62 causing it to rotate about pivotable connection 64 in a counterclockwise direction. This, in turn, heightens the spring 84 and relieves the force acting on lever 66 allowing it to move away from the flapper nozzle 70. By increasing the curtain area of flapper 70, the pressure drop across 78 is caused to increase reducing the pressure acting against diaphragm 46 thus allowing the connecting rod 38 of actuator 42 to move toward the left. This, in turn, causes the flapper 24 to rotate clockwise and flapper 22 to rotate counterclockwise by virtue of the links 30, 32 and 36 for closing off the high-stage bleed line 14.

The control may also include means for limiting the temperature being delivered to the air-conditioning package. Such means may include temperature sensor 100 having its free end connected to pivotable bellcrank 102. This bellcrank in turn controls flapper lever 104 and flapper nozzle 106 in much the same way as lever 66 varies area of nozzle 70. The area of nozzle 106 as set by lever 104 varies the pressure drop across restriction 78 which in turn varies the pressure bearing against diaphragm 46. This serves to position actuator 42 and consequently adjusts flaps 22 and 24 in the same manner as described above. Obviously, the temperature may be controlled to either maximum and/or minimum limits or both.

In addition, the control may include means for assuring that the pressure downstream of ejector 16 does not go below a predetermined value. Such mechanism may include a pressure sensing tap and line means 108 transmitting pressure to act on diaphragm 110. Plunger 112 attached to diaphragm 110 carries a flattened end 114 that projects laterally and is adapted to engage the shoulders of cage 116 at a predetermined position. This imparts an additional force to lever 66 for positioning it relative to nozzle 70 and readjusts the position flaps 22 and 24.

It should be understood that the invention is not limited to the particular embodiments shown and described herein, but that various changes and modifications may be made without departing from the spirit or scope of this novel concept as defined by the following claims.

I claim:

1. A control system for regulating the flow of bleed air taken from separate compressor stages in combination with a variable ejector having a variable area primary nozzle connected to the higher pressure of the compressor stages and a variable area secondary nozzle connected to the lower pressure of the compressor stages, actuator means for controlling the area of said variable area primary nozzle and the area of said variable area secondary nozzle, and control means responsive to the pressure upstream of said variable area secondary nozzle for controlling said actuator means.

2. A control system as claimed in claim 1 including a temperature sensor disposed downstream of said variable ejector, means responsive to said temperature for further controlling said actuator means.

3. A control system as claimed in claim 1 including a pressure sensor disposed downstream of said variable ejector, and means responsive to said pressure sensor for further controlling said actuator means.

4. A control system for regulating the flow of bleed air bled from separate stages of the compressor of a jet engine in which there includes midstage and high-stage bleeds,
   in combination with a variable area ejector which has its primary nozzle connected to the high-stage bleed and its secondary nozzle connected to the midstage bleed,
   actuator means connected to said variable area ejector for adjusting the area of the primary and secondary nozzles,
   control means responsive to the pressure of the fluid in the midstage bleed for controlling said actuator means,
   said control means including a pressure sensor having an output producing member imparting a signal to said actuator means, and
   feedback means interconnecting said ejector and said control means for nulling out said signal.

5. A control system as claimed in claim 4 including an evacuated bellows having a free end in contact with said pressure sensor whereby said signal is referred to an absolute pressure value.

6. A control system as claimed in claim 5 including temperature sensing means sensing the temperature of the fluid discharging from said primary and secondary nozzles,
   additional control means responsive to said temperature sensing means for further controlling said actuator.

7. A control system as claimed in claim 5 including an additional pressure sensor responding to the pressure in proximity to said ejector but downstream thereof, and
   means attached to said additional pressure sensor for overriding said signal and further control said actuator.

8. A control system for regualting the flow of bleed air taken from separate compressor stages of a power plant of the type that includes separate stages of compression in combination with an ejector having a primary nozzle and a secondary nozzle, at least one of said nozzles being variable so as to adjust the area thereof, actuator means for adjusting said variable area nozzle to change the area of said nozzle, the stages of compression of said compressor stages increasing the pressure of the fluid flowing therethrough in an ascending order, said separate compressor stages being a lower stage and a higher stage relative to the ascending order of said compressor stages, and means responsive to the pressure of said lower stages for controlling said actuator.

References Cited
UNITED STATES PATENTS

| | | | |
|---|---|---|---|
| 3,092,128 | 6/1963 | Pembleton | 230—114C |
| 3,137,210 | 6/1964 | Gavin | 230—114A |
| 3,143,293 | 8/1964 | Purse | 103—278 |
| 3,207,422 | 9/1965 | Best | 230—114A |
| 3,358,909 | 12/1967 | Mansson et al. | 230—45 |
| 3,423,011 | 1/1969 | Stepp | 230—112 |

CARLTON R. CROYLE, Primary Examiner

J. J. VRABLIK, Assistant Examiner

U.S. Cl. X.R.

417—188, 189, 198